April 12, 1966 G. E. HOOK ET AL 3,245,217
CANCELLATION VALVE
Filed Jan. 22, 1963
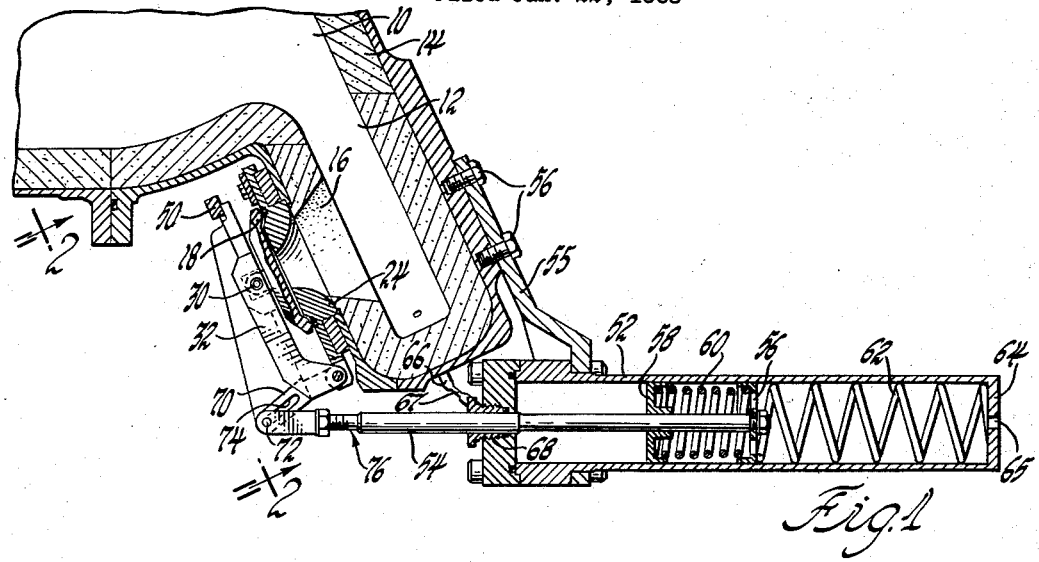
Fig. 1
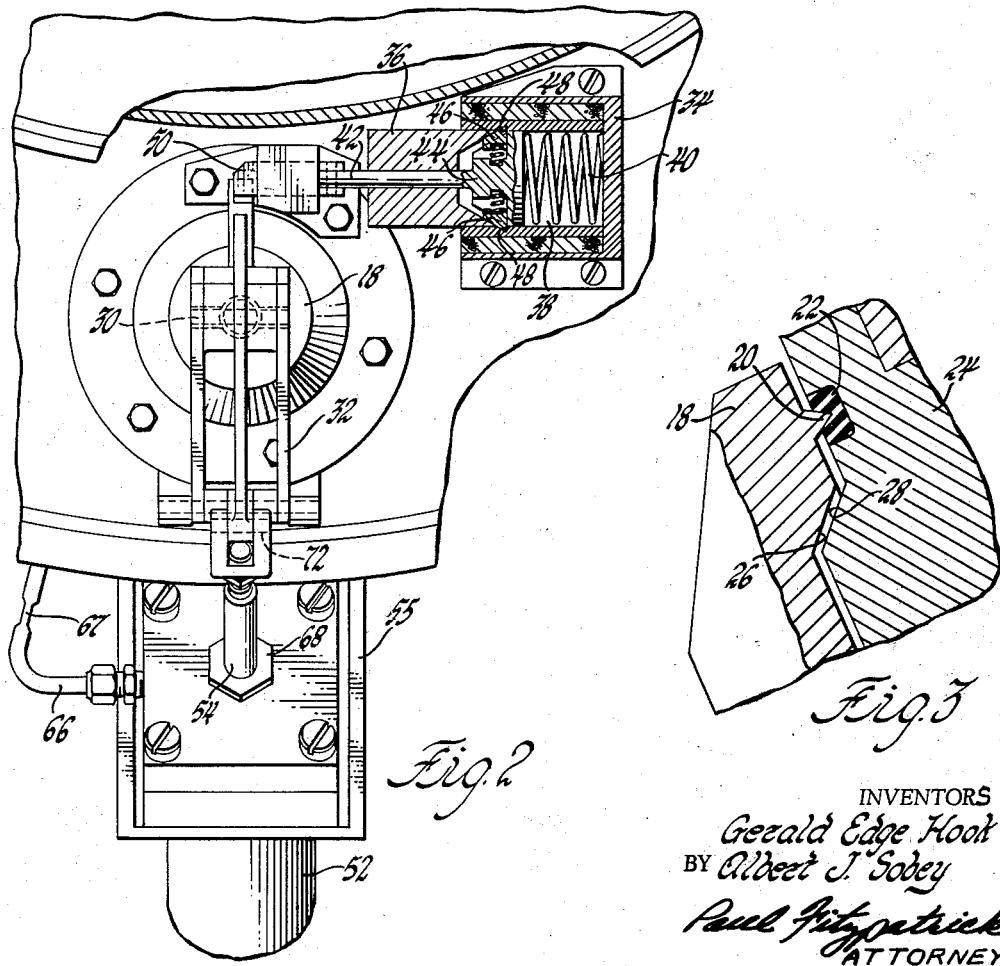
Fig. 2
Fig. 3
INVENTORS
Gerald Edge Hook &
BY Albert J. Sobey
Paul Fitzpatrick
ATTORNEY United States Patent Office 3,245,217
Patented Apr. 12, 1966

3,245,217
CANCELLATION VALVE
Gerald Edge Hook, Indianapolis, Ind., and Albert J. Sobey, Birmingham, Mich., assignors to General Motors Corporation, Detroit, Mich., a corporation of Delaware
Filed Jan. 22, 1963, Ser. No. 253,087
5 Claims. (Cl. 60—35.54)

This invention relates to thrust cancellation valves and, more particularly, it relates to thrust cancellation valves for rocket engines.

The highly specialized uses of rocket engines in current rockets and missiles dictate that they have highly accurate control means. In many instances, the application of thrust cancellation is necessary. A suggested way to accomplish thrust cancellatoin is through the use of a controlled valve which releases rocket engine chamber gases when desired, thereby reducing the resultant thrust of the engine. A distinct problem has arisen in providing a valve which will instantaneously open a bleed passage or thrust cancellation port on a rocket engine. A slow opening results in the concentration of the extremely hot gases in a certain area, thereby causing the burn-out of a section of the valve. A further need is for a valve that will both open and close the thrust cancellation port on a rocket engine. The present invention provides a valve mechanism which fulfills these requirements and overcomes the disadvantages of previous mechanisms. In general, the invention relates to a thrust cancellation valve for a rocket engine which comprises a pivotally mounted closure member to seal a thrust cancellation port through the liner wall of the combustion chamber, and actuation means therefor. The preferred closure member actuating means include a cylindrical chamber, an actuating rod slidably received by the chamber, an aperatured piston member fixed to the end of the actuating rod, a piston slidable on the actuating rod, an opening spring mounted on the actuating rod between the two piston members, a closing spring located in the chamber between the base of the chamber and the fixed piston and a connecting member fixed to the closure member and slidably pinned to the actuating rod. The closure member also has a locking mechanism to fix it over the thrust cancellation port including a solenoid, a solenoid plunger or armature, and a driven rod member having two spring-loaded detent members which are released by the solenoid plunger. The invention, then, provides a valve structure for opening and sealing a thrust cancellation port on a rocket engine.

It is, therefore, an object of this invention then to provide a quick acting valve which will instantaneously uncover a thrust cancellation port in a rocket engine.

It is a further object of this invention to provide a thrust cancellation valve that will reseal the thrust cancellation port in a rocket engine after the combustion chamber pressure drops to a predetermined level.

It is still a further object of this invention to provide a thrust cancellation valve that is relatively simple in structure and very easy to control.

It is an additional object of this invention to provide a solenoid operated latch means to restrict the opening of the thrust cancellation port closure means.

Other objects, features and advantages of the invention will become apparent upon reference to the succeeding detailed description of the invention and to the drawings illustrating the preferred embodiment thereof; wherein, FIGURE 1 is a side cross sectional view;
FIGURE 2 is a cross sectional view taken in the direction of arrows 2—2 in FIGURE 1; and
FIGURE 3 is a cross section view of a detail of FIGURE 1.

More specifically, FIGURE 1 shows the side cross sectional view of a rocket engine combustion chamber 10 with a thrust cancellation bleed chamber 12. The liner walls 14 of these chambers are constructed of any suitable material to withstand the temperatures developed therein. A suggested material is a carbon block or graphite substance. A converging thrust cancellation port 16 is cut through the chamber liner wall 14. Covering the thrust cancellation port 16 is a closure member 18. As seen in FIGURE 3, the closure member 18 is provided with a ridge or ring portion 20 that seats against an O-ring seal 22 which is contained in the rocket engine housing 24. The seating of this ridge 20 in the O-ring seal 22 provides an external seal. In addition, the closure member is provided with an undercut central portion having a tapered edge which matches a cooperating tapered edge of a raised portion on the rocket engine case to provide a minimum gap to protect the seal from the high temperature gases. This also is seen in FIGURE 3 where the undercut central portion 26 having a tapered edge is separated by a small gap from the cooperating tapered edge of a raised portion of the rocket case 28. The port sealing portion 18 of the closure member is coupled by a hinge pin 30 to a pivotally mounted portion 32 of the closure member. The pivotally mounted portion 32 of the closure member is fixed by a solenoid operated latch means as is shown in detail in FIGURE 2.

The closure member latch means is actuated by a solenoid 34. The solenoid 34 drives a solenoid plunger or armature 36 into a chamber 38 within the solenoid structure. A spring 40 is mounted against the end of the solenoid chamber 38. Slidably mounted within the solenoid plunger 36 is a rod 42 having a conical head 44. The conical head 44 of the rod member 42 has two spring-loaded detent members 46 which are slidingly received in grooves 48 in the solenoid chamber walls 38. Attached to the other end of the rod member 42 is the closure restraining or latch member 50. When activated by the solenoid 34, the solenoid plunger 36 is drawn into the solenoid chamber 38. Thus, the tapered leading edges of the solenoid plunger 36 disengage the spring-loaded detents 46 of the rod 42 and push the rod 42 against the spring 40. As a result of this action, the latch 50 attached to the rod 42 also is moved and releases the closure member structure 32. When the closure member 32 is returned to cover the thrust cancellation port, the solenoid 34 is deactivated thereby causing the spring member 40 to return the latch member 50 over the closure means thereby fixing it to the thrust cancellation port.

The remainder of the structure of the invention is contained in the actuating mechanism to pivotally remove the closure member from the thrust cancellation port and to return it thereon. As seen in FIGURE 1, a chamber 52 is mounted to the rocket engine case by a strut 55 and two bolts 56. The chamber 52 is cylindrical in shape and is sealed against outside gases. Slidably received within the chamber 52 is the actuating rod 54. Mounted on and fixed to the end of the actuating rod 54 within the chamber 52 is an apertured piston 56. A piston 58 is slidably mounted on the actuating rod 54 within the chamber 52. Between the two pistons 56 and 58 within the chamber 52 and mounted on the actuating rod 54 is an opening spring 60. A closing spring 62 is mounted within the chamber between the chamber head 64 and the piston 56. A gas bleed conduit 66 with an orifice 67 connects the seal chamber 52 with the thrust cancellation chamber 12. The actuating rod 54 enters the chamber 52 through a gland 68. The chamber 52 will be sealed at its receiving end and will be vented at its chamber head end 54 by an aperture 65.

The pivotally mounted portion 32 of the closure means and the actuating rod 54 are connected by a slotted connecting plate 70. The connecting means 70 is either integral with the closure member 18 or rigidly fixed thereto. The actuating rod 54 is connected to the connecting means by a pin 72 which slides in the slot 74. The actuating rod 54 also contains an adjusting screw mechanism 76 which adds to the accuracy of the operation.

Although the operation of the subject invention should be clear, a summary of the interrelation of the parts is presented here. As combustion occurs in the combustion chamber 10, the resultant gases fill the thrust cancellation chamber 12. They then are bled through the gas conduit 66 into the cylindrical chamber 52. As the gas pressure builds up in the chamber 52, the slidable piston 58, which has an effective seal between it and the chamber walls, compresses the opening spring 60 against the fixed apertured piston 56. The energy of the gas pressure then has been transferred to the opening spring 60 and is available for instantaneous release. At this point the device is in the cocked or activated position. Thus, the thrust cancellation device automatically activates itself so that it is ready to be instantaneously operated when desired. When the release of the closure member is desired, thus causing thrust cancellation, the solenoid latch mechanism is activated. A current is passed through the windings of the solenoid 34 thus causing a magnetic force which pulls the solenoid plunger into the solenoid chamber 38 as it proceeds into the solenoid chamber 38, the leading edges of the solenoid plunger 36 unseats the spring loaded detents 48 of the rod 42 thereby forcing the rod 42 into the chamber 38 against the action of the spring 40. As the rod 42 moves into the chamber 38, the latch 50 is also moved to the right and releases the closure member 32. At the instant the latch mechanism releases the closure member 32, the energy stored in the opening spring 60 pushes the piston 56 against the closing spring 62 and compresses it thereby pulling the actuating rod 54 into the chamber 52. As the actuating rod 52 is moved into the chamber 52, the pin 72 slides up the slot 74 in the connecting member 70 thereby activating a moment on the closure member 32. This moment then swings the closure member 32 away from the thrust cancellation port 16 and allows the release of the combustion gases. This instantaneous opening allows an even flow of the hot gases out through the thrust cancellation port 16 and reduces the chances of a localized burn out in the rocket engine casing 14. Now due to the orifice 67 in the gas conduit 66 the pressure drop in the chamber 52 will lag the decrease in pressure in the combustion chamber. Then when the pressure in chamber 52 drops to a predetermined value, the piston 58 will have moved to the left a sufficient amount so that the force of the closing spring 62 will overcome that of the opening spring 60 and push the actuating rod 54 out of the sealed chamber 52 thereby reseating the closure means 32 on the thrust cancellation port 16. When the closure member is reseated on the thrust cancellation port 16, the solenoid 34 is deactivated and the spring member 40 pushes the actuating rod and the latch 50 into the locked position thereby fixing the closure member 32 over the thrust cancellation port 60. The device then is ready for another operation upon the build up of combustion chamber pressure and the actuation of the solenoid latch mechanism. The built-in lag in the closing of the valve due to the orifice 67 in the conduit 66 is critical to the operation of the valve as it prevents the valve from being exposed to the high temperature gas stream.

Thus, it can be seen that the subject invention provides a simple yet functional method of accomplishing thrust cancellation in a rocket engine. It avoids the disadvantages of previous mechanisms by providing a closure member which instantaneously opens and closes the thrust cancellation port thereby allowing the gases to flow out in a full even pattern. The device will have special application to reignitable multi-stage rockets where the action of thrust cancellation is needed more than once. In a reignitable rocket engine, the subject invention would provide thrust control at many instances during the operation of the engine.

While the invention has been illustrated in connection with a rocket engine, it will be clear to those skilled in the art to which the invention pertains that it would have use in many installations other than that shown where an apparatus for instantaneous release of gas from a chamber is desired, and that many changes and modifications may be made thereto without departing from the scope of the invention.

A portion of the above disclosure is now the subject of divisional application S.N. 453,708 filed on May 6, 1965.

We claim:

1. A thrust cancellation valve for a rocket engine comprising a cancellation port, a thrust cancellation port closure mounted for movement between an open and a closed position, selectively releasable latch means to hold said closure in a closed position, and actuating means to move said closure to an open position upon release of said latch means, said actuating means including a cylindrical chamber, an actuating rod member extending through one end wall of said cylindrical chamber and reciprocable therein, a piston fixed to the end of said actuating rod, a closing spring located in said cylindrical chamber between said fixed piston and the other end wall of said cylindrical chamber, a second piston slideable on the actuating rod, an opening spring mounted on the actuating rod between said fixed piston and said second piston and a conduit connecting the portion of said cylindrical chamber between said one end wall and said second piston to the rocket engine combustion chamber whereby said combustion chamber pressure causes said second piston to slide toward said fixed piston to store energy in said opening spring, said stored energy being released upon release of said latch means to move said closure to an open position.

2. A thrust cancellation valve for a rocket engine comprising a cancellation port, a pivotally mounted thrust cancellation port closure, selectively releasable latch means to fix the closure means over the thrust cancellation port, and actuating means to pivotally move the closure means from the thrust cancellation port including a cylindrical chamber, an actuating rod member extending through one end wall of said cylindrical chamber and reciprocable therein, a piston fixed to the end of said actuating rod, a closing spring located in said cylindrical chamber between said fixed piston and the other end wall of said cylindrical chamber, a second piston slideable on the actuating rod, an opening spring mounted on the actuating rod between said fixed piston and said second piston and a conduit connecting the portion of said cylindrical chamber between said one end wall and said second piston to the rocket engine combustion chamber whereby said second piston is responsive to combustion chamber pressure and slides toward said fixed piston at high combustion pressures to store energy in said opening spring, said stored energy being released upon release of said latch means to move said closure to an open position.

3. A thrust cancellation valve for a rocket engine comprising a cancellation port, a thrust cancellation port closure mounted for movement between an open and a closed position, selectively releasable latch means to hold said closure in a closed position, and actuating means to move said closure to an open position upon release of said latch means and to return said closure to a closed position upon sufficient thrust cancellation, said actuating means including a cylindrical chamber, an actuating rod member extending through one end wall of said cylindrical chamber and reciprocable therein, a piston fixed to the end of said actuating rod, a closing spring located in said cylindrical chamber between said fixed piston and the other end wall of said cylindrical chamber, a second piston slideable on the actuating rod, an opening spring mounted on the actuating rod between said fixed piston and said second piston and a conduit having a restriction orifice therein connecting the portion of said cylindrical chamber between said one end wall and said second piston to the rocket engine combustion chamber whereby said second piston is responsive to combustion chamber pressure and slides toward said fixed piston at high combustion pressures to store energy in said opening spring, said stored energy being released upon release of said latch means to move said closure to an open position and said second piston is urged toward said one end wall at lower combustion pressures by said closing spring to return said closure to a closed position after a lag caused by said restriction orifice.

4. A thrust cancellation valve for a rocket engine comprising a cancellation port, a thrust cancellation port closure mounted for movement between an open and a closed position, selectively releasable latch means to hold said closure in a closed position, and actuating means to move said closure to an open position upon release by said latch means, said actuating means including a fluid motor in communication with the combustion chamber of said rocket engine and an energy storing means operatively connected thereto whereby high pressures in said combustion chamber expand said fluid motor to store energy in said energy storing means which is released upon release of said latch means to instantaneously move said closure to an open position.

5. The combination as claimed in claim 4 wherein said actuating means further includes a spring means to move said valve to a closed position at lower combustion pressures.

References Cited by the Examiner
UNITED STATES PATENTS

| | | | |
|---|---|---|---|
| 2,488,224 | 11/1949 | Mothorn | 91—453 |
| 2,712,429 | 7/1955 | Ray | 251—68 |
| 2,847,822 | 8/1958 | Hausmann | 60—35.54 |
| 2,853,658 | 9/1958 | Lindenberg | 317—187 |
| 2,924,235 | 2/1960 | Knudsen | 251—68 |
| 2,933,889 | 4/1960 | Tolkmitt | 60—35.54 |
| 2,984,065 | 5/1961 | Stuhler | 60—7 |
| 2,989,070 | 6/1961 | Sulzmann | 251—68 |
| 3,038,303 | 6/1962 | Gose | 60—35.6 |
| 3,052,091 | 9/1962 | D'Ooge | 60—35.6 |
| 3,101,434 | 8/1963 | Kitscha | 317—187 |

MARK NEWMAN, *Primary Examiner.*

SAMUEL LEVINE, *Examiner.*